United States Patent Office 2,794,752
Patented June 4, 1957

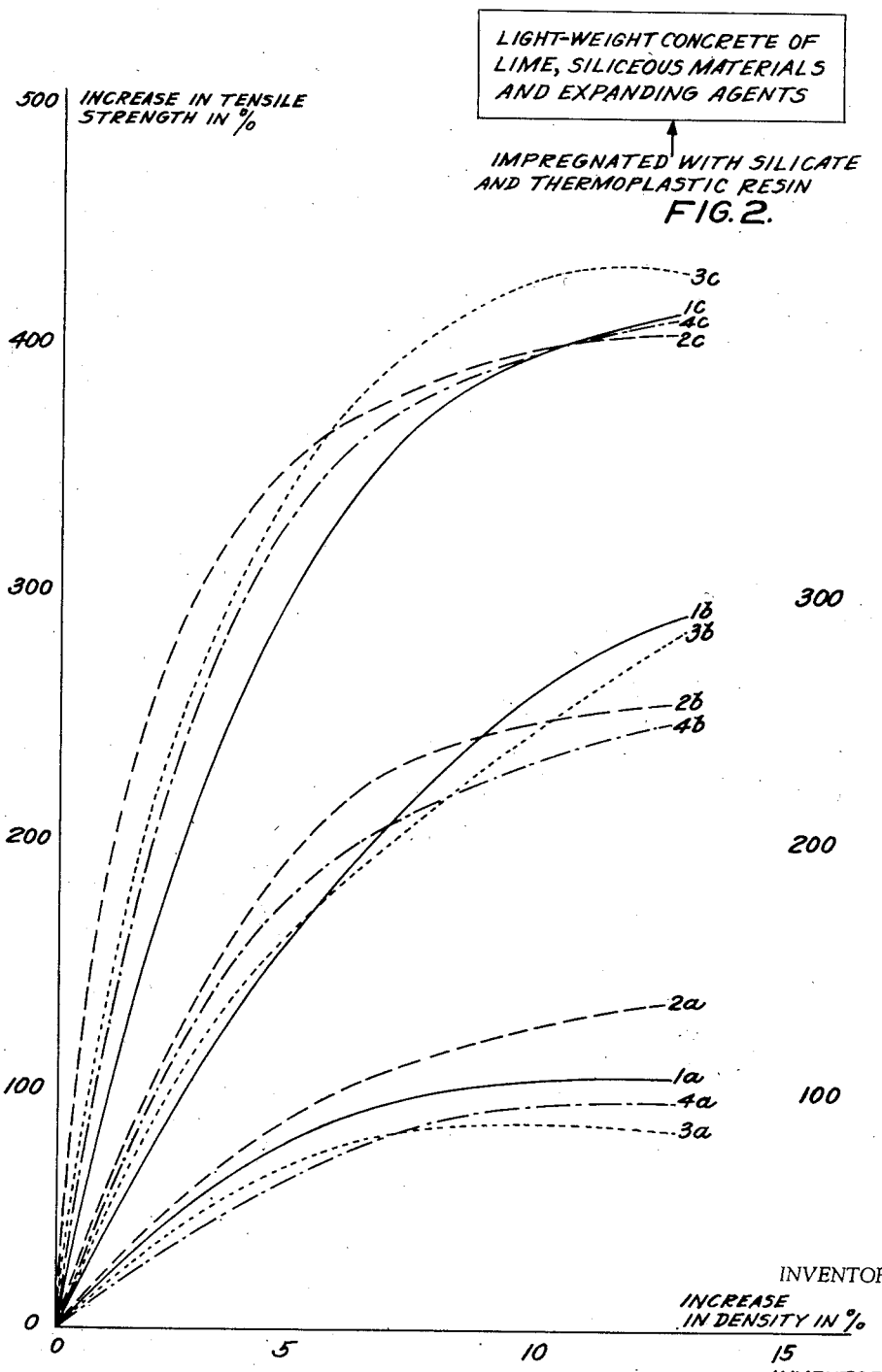

2,794,752

IMPREGNATION OF LIGHT-WEIGHT CONCRETE WITH SILICATE AND THERMOPLASTIC RESINS

Bertil John Martin Schmidt, Pershagen, Sweden, assignor to Internationella Siporex AB, Stockholm, Sweden, a corporation of Sweden Application November 19, 1953, Serial No. 393,140

9 Claims. (Cl. 117—118)

This invention concerns the manufacture of molded porous light-weight concrete or cellular concrete and the invention has for its object the provision of a considerable increase of the strength properties, more particularly the tensile strength, of such concrete bodies, for example blocks and slabs.

It is known that steam-cured porous light-weight concrete bodies produced from mineral binders having a high content of lime, siliceous substances or materials, at least one of which is capable of reacting with the lime in the steam-curing operation with formation of calcium silicates, and expanding agents producing a high degree of porosity in the concrete, possesses high strength properties, especially compressive strength, in relation to its low density. For special purposes, however, a still higher strength, especially tensile strength, is required, particularly in case of light-weight concrete qualities with a density below 0.6 kg./dm.$^3$.

It has been found that a surface treatment of light-weight concrete bodies wtih coloring materials containing water-soluble silicates as binding agents results in a considerable increase of the tensile strength of that part of the concrete body into which the silicate solution has penetrated. A similar effect is obtained by treating light-weight concrete bodies with coloring material on the basis of organic binders, for example, alkyd resins.

The present invention is based on the following surprising observations made in the course of my experiments and investigations concerning impregnation of light-weight concrete bodies with substances of the above-mentioned kind.

If a light-weight concrete body is impregnated with a solution of a water-soluble silicate in such an amount that the density of the concrete is increased, for example by 5%, the tensile strength of the body increases for example by 80%, the value being to a certain degree dependent on the quality of the concrete. When using an emulsion of a thermoplastic resin as the impregnating agent under the same conditions in other respects, the increase in tensile strength is still higher and may amount to about 200%. When impregnation was carried out with both agents, however, for example, with equal parts of the silicate solution and the resin emulsion, but still in such total amounts that the increase in density resulting from the treatment was 5%, it was surprisingly found that the tensile strength increases considerably above 200%. This implies that the effect of the combined treatment is more than an additive effect.

Based on the above-mentioned discoveries the process of improving the tensile strength properties of porous light-weight concrete bodies according to the present invention comprises, in combination, an impregnation with a water-soluble silicate solution and a solution or an emulsion of a thermoplastic resin.

Suitable silicates are alkali metal silicates in aqueous solution.

As examples of suitable thermoplastic resins for the purpose of the invention may be mentioned polyvinylchloride, polyvinylacetate, copolymerizates of polyvinylchloride and polyvinylacetate, polybutadiene, polyethylene, vinylidenchloride, polystyrol, methylmethacrylate, nylon, casein, chlorinated rubber, and combinations of said resins. The resins may be applied in the form of solutions in any suitable solvent or, preferably, in the form of aqueous emulsions.

The impregnation may be effected in any suitable way, for example by a vacuum or pressure impregnation, or by immersion, until an impregnation of the body to the desired depth, e. g. the desired increase of the density has been obtained. The impregnation may be carried out in a single step with a mixture of the silicate and resin components, or in two or more steps, for example first with an alkali silicate solution and then with a solution or emulsion of a thermoplastic resin, or vice versa, with or without intermediate drying of the concrete body. Preferably the impregnating agents are applied together in an aqueous medium containing, for example, 1–10%, suitably, 3–6%, by weight of the impregnating substances.

The amounts of the impregnating agents supplied may suitably be such that the increase in density of the concrete body corresponds to 2 to 10%, based on the density of the concrete body before the impregnating treatment. Preferably impregnation is carried out in such a way that the increase in density is within the range 4 to 8%. Suitably the increase in density should not be higher than 10% in order to avoid a reduction of the diffusion capacity of the concrete body to an undesirable degree.

The manner of carrying out the impregnation in practice is further described in the following examples with reference to the accompanying drawing. In the drawing, the increase in tensile strength obtained by the treatment according to the invention is illustrated diagrammatically, the increase in density of the concrete body being stated on the abscissa and the increase in tensile strength on the ordinate, in both cases expressed in per cent, based on the original density and tensile strength of the concrete, respectively.

In Fig. 1 of the drawing, the curves $a$ show by way of comparison the increase in tensile strength obtained by impregnation of a light-weight concrete body solely with an alkali silicate solution, similarly the curves $b$ show the increase in tensile strength obtained by impregnation under the same conditions solely with an emulsion of a thermoplastic resin. The curves $c$ show the effect of the combined impregnation with the above-mentioned two agents, according to the invention. Fig. 2 shows the article made by this process.

Example 1

A light-weight concrete block having a density of 0.44 kg./dm.$^3$ which had been produced from cement, finely ground sand and water and expanded by means of pulverized aluminum and finally steam-cured was impregnated with a solution of sodium silicate containing emulsified therein a high-polymerized vinylchloride resin, the impregnating agents being present in the proportion 1:1 and in a total amount of 5% by weight. After impregnation the block was dried at 100° C.

The increase in tensile strength of the concrete block thus obtained is illustrated by the curve $1c$ in comparison with the curves $1a$ and $1b$ showing the effect of an impregnation with solely sodium silicate and the resin, respectively.

Example 2

A block of light-weight concrete was produced from Portland cement, lime, kieselguhr, asbestos fibre and sufficient water to give a final product having the density 0.35 kg./dm.$^3$ when steam-cured. This block was impregnated with a solution of sodium silicate containing emulsified therein an acrylate of a hard-elastic type, the proportion of the impregnating agents being 70:30 and the total concentration thereof 5% by weight. The drying of the block thus impregnated was carried out at 80–90° C.

The effect of the impregnation is illustrated by the curve 2c in comparison with the curves 2a and 2b showing the result of an impregnation with solely sodium silicate and acrylate resin, respectively.

*Example 3*

A cellular concrete having the density 0.55 kg./dm.³ was produced by foaming mixtures of lime and fly ash having a high content of water, and steam-curing after setting. A block of the said material was impregnated in two stages, namely with:

(1) A solution of potassium silicate and then, after drying 1 hour in the air, (2) A dispersion of polystyrol in water, in such a proportion that the concrete after a final drying at normal temperature contains the impregnating agents in the ratio 65% by weight of silicate and 35% of polystyrol.

The result of the impregnation is illustrated by the curve 3c in comparison with the curves 3a and 3b, as indicated above in the Examples 1 and 2.

*Example 4*

A block of light-weight concrete having a density of 0.47 kg./dm.³ was produced from lime, slate ash and water and expanded with pulverized aluminium and finally steam-cured. This block was treated with a solution containing 40% by weight of a latex of chlorinated rubber and 60 parts by weight of a mixture of sodium silicate and potassium silicate in the proportion 1:1. The impregnated block was dried at a temperature of 75–80° C.

The effect of the impregnation is illustrated by the curve 4c in comparison with the curves 4a and 4b, as indicated in the previous examples.

While various embodiments of my invention have been hereinabove indicated, it will be understood that the invention of this application is not limited to the specific examples herein recited but that numerous modifications and variations thereof may be made without departing from the principles of my invention.

What I claim is:

1. In the manufacture of molded bodies of steam-cured lightweight concrete from mineral binders having a high content of lime, siliceous materials capable of reacting with the lime in the steam-curing operation with formation of calcium silicates, water and expanding agents producing a high degree of porosity in the concrete, the process of impregnating the concrete bodies to increase their tensile strength, which comprises subjecting the concrete bodies to an impregnation with both a water-soluble silicate and a themoplastic resin.

2. The process of claim 1 wherein the impregnation is carried out in a single operation with both impregnating agents in a common medium.

3. The process of claim 1 wherein the impregnation is carried out with both impregnating agents together in an aqueous medium.

4. The process of claim 1 wherein the concrete bodies after impregnation are subjected to a drying at elevated temperature.

5. In the manufacture of molded bodies of steam-cured light-weight concrete from mineral binders having a high content of lime, siliceous materials capable of reacting with the lime in the steam-curing operation with formation of calcium silicates, water and expanding agents producing a high degree of porosity in the concrete, the process of impregnating the concrete bodies to increase their tensile strength, which comprises subjecting the concrete bodies to an impregnation with both a water-soluble silicate and a thermoplastic resin in amounts sufficient to cause an increase of the density of the bodies of from 2 to 10% by weight, based on the density of the concrete bodies before impregnation.

6. In the manufacture of blocks, slabs and similar molded bodies of steam-cured light-weight concrete from mineral binders having a high content of lime, siliceous materials capable of reacting with the lime in the steam-curing operation with formation of calcium silicates, water and expanding agents producing a high degree of porosity in the concrete, the process of impregnating the concrete bodies to increase their tensile strength, which comprises subjecting the concrete bodies to an impregnation in a single operation with both an alkali metal silicate and a thermoplastic resin contained in an aqueous medium.

7. The process as set forth in claim 6 characterized by the fact that the weight of the impregnating agents is in the range of 1 to 10% by weight, and that said impregnation will increase the density of the concrete bodies in the range of 4 to 8%.

8. The process as set forth in claim 7 characterized by the fact that the density of the concrete bodies is in the range of .35 to .55 kg./dm.³.

9. The process as set forth in claim 8 characterized by the step that impregnation of the concrete bodies occurs under force.

References Cited in the file of this patent

UNITED STATES PATENTS

| | | |
|---|---|---|
| 1,160,363 | Baekeland | Nov. 16, 1915 |
| 1,521,384 | Marcusson | Dec. 30, 1924 |
| 2,152,917 | Quisling | Apr. 4, 1939 |
| 2,588,828 | Greiner | Mar. 11, 1952 |